(12) United States Patent
Herbel

(10) Patent No.: US 9,697,299 B2
(45) Date of Patent: Jul. 4, 2017

(54) EMBEDDED SYSTEM WEB SERVER

(71) Applicant: Raytheon Company, Waltham, MA (US)

(72) Inventor: Richard S. Herbel, Anaheim, CA (US)

(73) Assignee: RAYTHEON COMPANY, Waltham, MA (US)

( * ) Notice: Subject to any disclaimer, the term of this patent is extended or adjusted under 35 U.S.C. 154(b) by 277 days.

(21) Appl. No.: 13/956,823

(22) Filed: Aug. 1, 2013

(65) Prior Publication Data

US 2015/0039981 A1 Feb. 5, 2015

(51) Int. Cl.
*G06F 17/30* (2006.01)

(52) U.S. Cl.
CPC ............... *G06F 17/30893* (2013.01)

(58) Field of Classification Search
CPC .. G06F 3/0484; G06F 3/04817; G06F 3/1254; G06F 8/70; G06F 8/71; G06F 17/2235; G06F 21/6218; G06F 2221/2117; G06Q 30/0621; H04L 29/0809; H04L 29/06836; H04L 29/08081; H04L 41/5051; H04L 51/046; H04L 63/10; H04L 63/102; H04L 67/02; H04L 67/141; H04L 67/306
See application file for complete search history.

(56) References Cited

U.S. PATENT DOCUMENTS

| | | |
|---|---|---|
| 6,170,007 B1 * | 1/2001 | Venkatraman et al. ...... 709/218 |
| 6,230,307 B1 | 5/2001 | Davis et al. |
| 6,456,308 B1 | 9/2002 | Agranan et al. |
| 6,529,936 B1 * | 3/2003 | Mayo ................. G06F 17/3089 707/E17.116 |
| 6,892,230 B1 | 5/2005 | Gu et al. |
| 7,085,938 B1 * | 8/2006 | Pozzuoli et al. ............. 713/300 |
| 8,289,185 B2 * | 10/2012 | Alonso ................... 340/870.11 |
| 2002/0123365 A1 | 9/2002 | Thorson et al. |

(Continued)

FOREIGN PATENT DOCUMENTS

WO WO2005050847 6/2005

OTHER PUBLICATIONS

Raghuwar Sharan Soni, et al., "Development of Embedded Web Server Configured on FPGA Using Soft-core Processor and Web Client on PC," International Journal of Engineering and Advanced Technology (IJEAT), ISSN: 2249-8958, vol. 1, Issue-5, Jun. 2012, 4 pages.

(Continued)

*Primary Examiner* — Kavita Padmanabhan
*Assistant Examiner* — Warren Campbell, Jr.
(74) *Attorney, Agent, or Firm* — Cantor Colburn LLP

(57) ABSTRACT

A method for implementing a web server in an embedded system is provided. Registration information is received at the web server in the embedded system from a plurality of objects. Each object provides a link to itself in the registration information. The registration information is stored in a registry as a list of links mapped to the objects. A web page is dynamically generated at runtime by the web server based on the registration information in the registry to provide a user interface including a visual depiction of the links on the web page. The web page is provided to a web browser external to the embedded system such that the objects are accessible to the web browser based on the links through the user interface.

18 Claims, 4 Drawing Sheets

(56) References Cited

U.S. PATENT DOCUMENTS

| | | | |
|---|---|---|---|
| 2002/0133376 A1 | 9/2002 | Fritschen et al. | |
| 2003/0158975 A1* | 8/2003 | Frank | G06F 8/34 |
| | | | 719/331 |
| 2004/0268299 A1* | 12/2004 | Lei | G06F 9/4443 |
| | | | 717/106 |
| 2006/0095855 A1* | 5/2006 | Britt et al. | 715/760 |
| 2006/0238406 A1* | 10/2006 | Nohara | G01S 7/003 |
| | | | 342/90 |
| 2010/0042350 A1 | 2/2010 | de Wild et al. | |
| 2012/0310504 A1 | 12/2012 | DuHadway et al. | |

OTHER PUBLICATIONS

Dr. Dobb's Self-Registering Objects in C++, Aug. 1, 1998, Retrieved from the internet: http://www.drdobbs.com/cpp/self-registering-objects-in-c/184410633 Jun. 17, 2013, 4 pages.
Agusti Fontquerni Gorchs, Embedded Linux Conference Europe 2012 (Barcelona—Nov. 5-7), Embedded Linux RADAR device, Taking advantage on Linaro tools and HTML5 AJAX real-time visualization, 27 pages.

* cited by examiner

EMBEDDED SYSTEM WEB SERVER

BACKGROUND

The present invention relates to computer processing systems, and more specifically, to a web server in an embedded computer processing system.

Computer systems are often incorporated in embedded systems to provide dedicated control and monitoring functions for larger mechanical and/or electrical systems. In contrast to a general purpose computer system, an embedded system is optimized to perform specific tasks. As such, an embedded system is typically designed to meet certain minimum feature requirements but may not directly include a general-purpose user interface. As one example, an embedded system can be implemented as one or more cards installed in a chassis designed to operate in a variety of environmentally harsh conditions, such as a mobile radar control system. An embedded system can incorporate interfaces to a number of sensors and actuators, but may have limited ability to support reconfiguration and low-level diagnostics when deployed in an intended field of operation.

Some embedded systems can engage in user initiated built-in tests, but collection and display of results may be limited to simple codes depending upon user interface capabilities of the embedded systems. Other embedded systems implement complex proprietary communication interfaces to provide test and diagnostic support. Such proprietary solutions can be difficult to maintain as they often require special purpose software both internal and external to the embedded systems. Once embedded systems are deployed in the field, it can also be challenging to manage version control issues as various deployed systems may have different versions of software and hardware configurations. Managing interactions between interdependent components with different version combinations adds to the complexity of interface design.

SUMMARY

According to one embodiment of the present invention, a method for implementing a web server in an embedded system is provided. Registration information is received at the web server in the embedded system from a plurality of objects. Each object provides a link to itself in the registration information. The registration information is stored in a registry as a list of links mapped to the objects. A web page is dynamically generated at runtime by the web server based on the registration information in the registry to provide a user interface including a visual depiction of the links on the web page. The web page is provided to a web browser external to the embedded system such that the objects are accessible to the web browser based on the links through the user interface.

According to another embodiment of the present invention, an embedded system is provided that includes a registry and a web server configured to receive registration information from a plurality of objects. Each object provides a link to itself in the registration information. The registration information is stored in the registry as a list of links mapped to the objects. The web server is further configured to dynamically generate a web page at runtime based on the registration information in the registry to provide a user interface including a visual depiction of the links on the web page. The web server is also configured to provide the web page to a web browser external to the embedded system such that the objects are accessible to the web browser based on the links through the user interface.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
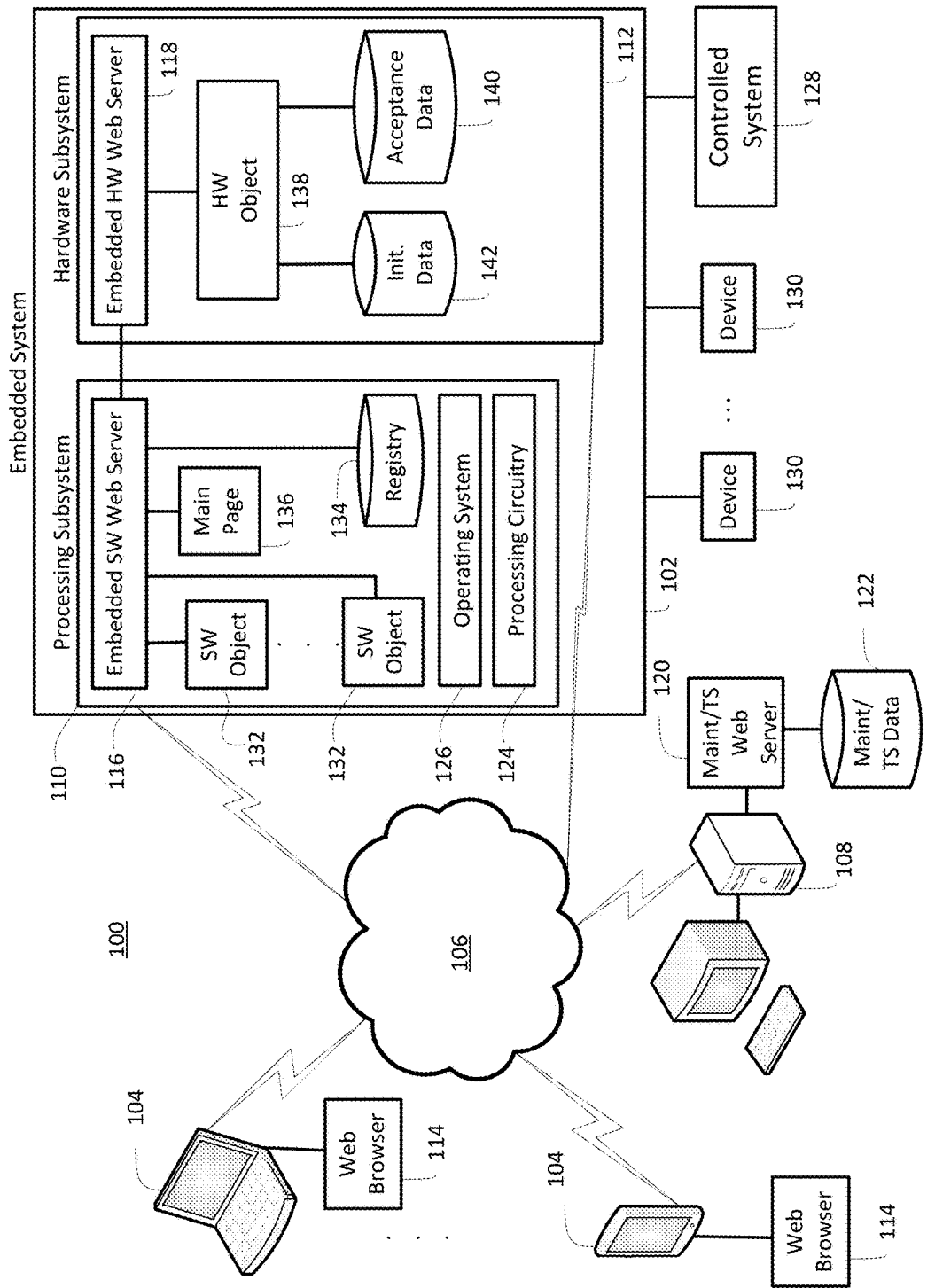
FIG. 1 illustrates a block diagram of an exemplary embodiment of a system interfacing an embedded system web server to a web browser.

The embodiments described herein include systems and methods for providing a web server in an embedded system. FIG. 1 illustrates a block diagram of an exemplary embodiment of system 100 including an embedded system 102 and a plurality of client systems 104 that are external to the embedded system 102. The embedded system 102 and the client systems 104 are configured to communicate via a network 106. Other computer systems, such as maintenance or troubleshooting aid computer system 108 may also be coupled to the network 106. In the example of FIG. 1, the embedded system 102 includes a processing subsystem 110 and a hardware subsystem 112, which are both coupled to the network 106. The network 106 may be an Ethernet network and can include a combination of wired, wireless, and/or optical links, as well as routers, hubs, switches, and the like (not depicted) to enable communication. Where the embedded system 102 is embodied in a chassis configured to hold multiple cards, the processing subsystem 110 and the hardware subsystem 112 may be partitioned on separate cards or on opposite sides of a common card. It will be understood that there can be multiple instances of either or both of the processing subsystem 110 and the hardware subsystem 112, as well as additional subsystems, within the embedded system 102 of FIG. 1.

The client systems 104 and maintenance or troubleshooting aid computer system 108 can include a variety of desktop, laptop, general-purpose computer devices, mobile computing devices, and/or networked devices with processing circuits and input/output (I/O) interfaces, such as keys/buttons, a touch screen, audio input, a display device and/or audio output. The client systems 104 and maintenance or troubleshooting aid computer system 108 can include various computer/communication hardware and software technology known in the art, such as one or more processing units or circuits, volatile and non-volatile memory including removable media, power supplies, network interfaces, support circuitry, operating systems, and the like. The client systems 104 can each execute one or more web browsers 114 that are operable to communicate through the network 106 with one or more web servers in the embedded system 102. In the example of FIG. 1, the embedded system 102 includes an embedded software web server 116 in the processing subsystem 110 and an embedded hardware web server 118 in the hardware subsystem 112, although additional or fewer web servers may be incorporated in the embedded system 102. The web browsers 114 and web servers 116 and 118 can also communicate the through the network 106 with a maintenance or trouble shooting aid web server 120 on the maintenance or troubleshooting aid computer system 108 to access, for example, maintenance or troubleshooting aid data 122.

In the example of FIG. 1, the processing subsystem 110 includes processing circuitry 124 and an operating system 126, where the embedded software web server 116 can be implemented as an application executable by the processing circuitry 124 through the operating system 126. In contrast, the embedded hardware web server 118 may be implemented in one or more of: a field programmable gate array (FPGA), application specific integrated circuit (ASIC), programmable logic device (PLD), or other hardware that need not rely upon an operating system. The hardware subsystem 112 may perform low-level signal control and timing to support operation of a controlled system 128 coupled to the embedded system 102. The embedded system 102 is optimized to perform specific control and monitoring tasks with respect to the controlled system 128 and one or more other devices 130. As one example, the controlled system 128 can be a radar system, and the one or more other devices 130 can include a global positioning system (GPS) locator.

There may be a number of software objects 132 in the processing subsystem 110 that include a user interface to support interactions with the web browser 114 through the embedded software web server 116. The software objects 132 can be implemented using an object-oriented programming language to encapsulate particular functions. For example, software objects 132 can map to the controlled system 128 and/or one or more of the devices 130. Furthermore, the software objects 132 can encapsulate particular models, diagnostics, or configuration parameters for the embedded system 102. The software objects 132 that interface with the embedded software web server 116 are self-registering upon initialization. The embedded software web server 116 can store registration information associated with the software objects 132 in a registry 134 from which a main web page 136 is dynamically generated. The main web page 136 is also referred to as the main page 136 or the web page 136. The registry 134 may store a list of links mapped to the software objects 132, as well as a desired display position on the main web page 136, an image associated with each software object 132, and an indication as to whether each software object 132 supports a real-time data feed.

Changes to the registry 134 can result in modifications to the main web page 136 at initialization or during runtime. For example, if a new software object 132 is created during runtime of the embedded software web server 116, self-registration of the new software object 132 upon its initialization results in a change to the registry 134 when new registration information associated with the new software object 132 is added. A change to the registry 134 may trigger dynamic regeneration of the main web page 136. Changes to non-displayed parameters in the registry 134 can also change system behavior but may not result in a change to the main web page 136. For example, if a software object 132 determines that a real-time data feed can now be supported, re-registration of a modified version of the software object 132 need not result in a change to the main web page 136 but will impact how communication is managed by the embedded software web server 116 when the modified version of the software object 132 is selected by the web browser 114.

The main web page 136 can also include links to other objects, such as a hardware object 138 on the hardware subsystem 112. The hardware object 138 can self-register with the embedded hardware web server 118, which can in turn pass a link for the hardware object 138 to the registry 134 via the embedded software web server 116. Alternatively, the embedded hardware web server 118 can create a separately accessible web page (not depicted) for the hardware object 138. The hardware object 138 can support a number of lower level functions to implement user-initiated built-in tests. The hardware object 138 is configured to provide its own user interface to enable a user to perform one or more of: running a detailed hardware test, uploading acceptance data 140, downloading initialization data 142, delivering fault information, and updating runtime statistics via the web browser 114. Although only one hardware object 138 is depicted in the example of FIG. 1, additional hardware objects 138 can also be supported by the embedded hardware web server 118 or other web servers (not depicted) in the embedded system 102.

The hardware object 138 and software objects 132 may also link to each other, as well as have links external to the embedded system 102. As one example, upon detection of a failure by one of the hardware object 138 or software objects 132, the associated object can provide maintenance or troubleshooting aid data 122 to the web browser 114 through the maintenance or troubleshooting aid web server 120.

As new objects are added to the embedded system 102, the self-registration of objects and dynamic creation of one or more web pages enables rapid localized updates without requiring changes to a number of user interfaces. Linking between objects and locations external to the embedded system 102 provides a robust solution to integrate multiple related objects while reducing the amount of local data storage required within the embedded system 102. Using a web browser-based interface to access details within the embedded system 102 can result in a wide number of supported client-side devices while also allowing users to navigate through a familiar environment, i.e., web browser 114. Although multiple client systems 104 and web browsers 114 are depicted in FIG. 1, it will be understood that a single client system 104 may be supported. When supporting communication with multiple web browsers 114, the embedded system 102 may implement sharing/locking logic, such as a semaphore, to control access to particular resources within the embedded system 102.

Figure 2:
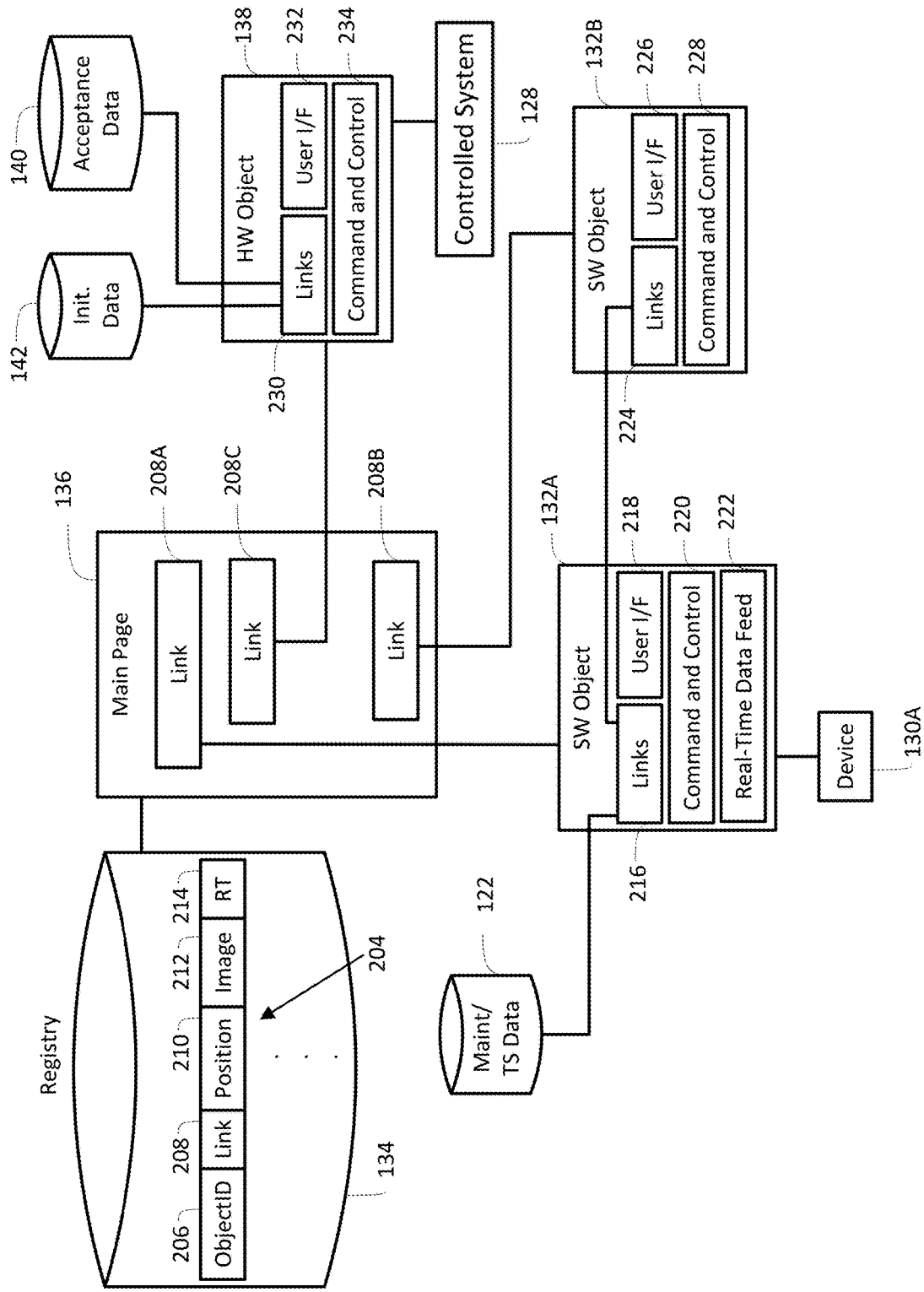
FIG. 2 illustrates a block diagram of various links between a main page, objects, and data.

FIG. 2 illustrates a block diagram of various links between the main web page 136, objects 132 and 138, and data 122, 140, and 142. For purposes of explanation there are two software objects 132A and 132B depicted and one hardware object 138 depicted; however, any number or combination of software and/or hardware objects may be supported. As each of the objects 132A, 132B, and 138 self-registers upon initialization, registration information 204 is stored in the registry 134. Fields in the registration information 204 can include, for example, an object identifier 206, a link 208, a desired display position 210, an associated image 212, and a real-time data feed support indication 214. Additional or fewer fields can be supported. Each of the objects 132A, 132B, and 138 provides its own respective registration information 204 upon self-registration.

A web server, such as the embedded software web server 116 of FIG. 1, accesses the registration information 204 stored in the registry 134 and dynamically generates the main web page 136. For example, the embedded software web server 116 of FIG. 1 can access object identifiers 206 and links 208 associated with various objects in the registry 134 and insert corresponding instances of the links 208 in the main web page 136. The desired display position 210 indicates a desired location on the main web page 136 to insert a link 208 along with an associated image 212. The desired display position 210 may be specified based on x-y coordinates, rows and columns, or simply a desired row. When only a row is specified as the desired display position 210, a respective column can be determined dynamically based on the ordering of data in the registry 134. The associated image 212 may be specified as a file path to an image file. The associated image 212 may simply be a text label to display or can be omitted in various embodiments.

In the example of FIG. 2, on the main web page 136, link 208A points to software object 132A, link 208B points to software object 132B, and link 208C points to hardware object 138. As additional objects self-register, additional links 208 can be included in the main web page 136 upon dynamic regeneration of the main web page 136. The software object 132A includes links 216 to maintenance or troubleshooting aid data 122 and to software object 132B. The software object 132A also includes a user interface 218 which can be provided as a complete human-machine interface to a web browser 114 of FIG. 1 or can be merged with a portion of the main web page 136. The software object 132A may also include command and control logic 220 to support interfacing with a device 130A, which is one of the devices 130 of FIG. 1, via the user interface 218. The software object 132A may further include a real-time data feed 222 to pass data associated with the device 130A back to a web browser 114 of FIG. 1 in real-time such that continuous monitoring can be performed without repeated requests from the web browser 114. In the example of FIG. 2, the software object 132B includes links 224 back to the software object 132A, a user interface 226, and command and control logic 228. The command and control logic 228 is accessible through the user interface 226 may include model calculations or initiation of internal tests within the embedded system 102 of FIG. 1. The hardware object 138 includes links 230 to the acceptance data 140 and initialization data 142, a user interface 232, and command and control logic 234 configured to interface with the controlled system 128. The user interface 232 can provide a user access to the controlled system 128 through the command and control logic 234, as well as support initiation of various tests via a web browser 114 of FIG. 1.

Figure 3:
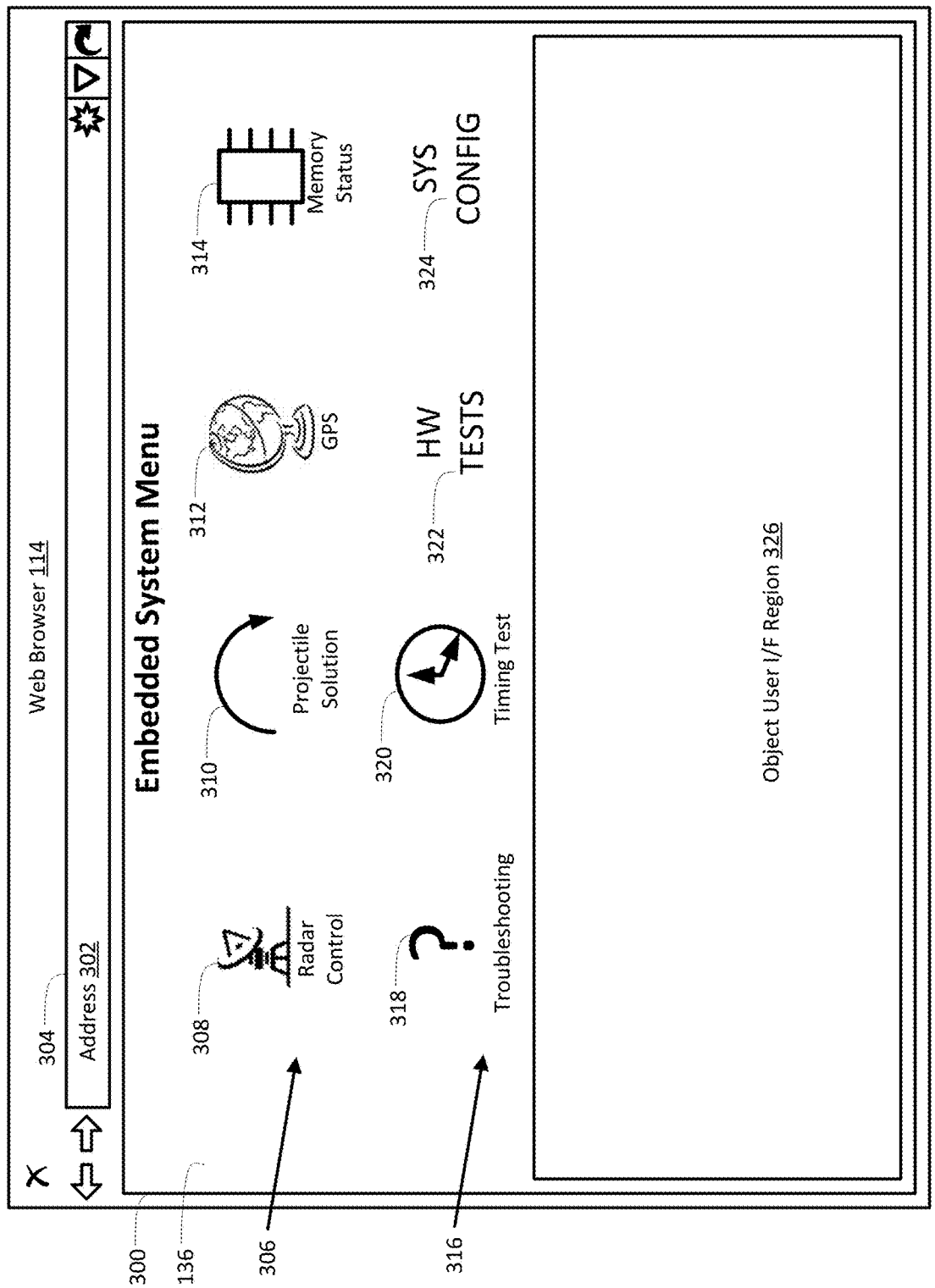
FIG. 3 illustrates an example of a user interface accessible through a web browser.

FIG. 3 illustrates an example of a user interface 300 accessible through web browser 114 of FIG. 1. The main web page 136 may be accessed by the web browser 114 through the network 106 of FIG. 1 by establishing communication with a web server, such as the embedded web server 116 of FIG. 1. A user can enter an address 302 into an address bar 304 of the web browser 114 to request access to the main web page 136. The main web page 136 can provide the web browser 114 with the user interface 300, which is an example based on contents of the registry 134 of FIG. 1. In the example of FIG. 3, a first row 306 contains images and associated descriptions as visual depictions for a first link 308 to a radar control, a second link 310 to a projectile solution, a third link 312 to a GPS device, and a fourth link 314 to a memory status check. A second row 316 contains images and associated descriptions as visual depictions for a fifth link 318 to troubleshooting, a sixth link 320 to a timing test 320, a seventh link 322 to hardware tests, and an eighth link 324 to system configuration. The seventh and eighth links 322 and 324 are examples where there are only text labels and no images associated with the links.

The visual depiction of links 308-314, 318-324 corresponds to links 208 of FIG. 2 in the registry 134. Upon selecting one of the links 308-314, 318-324, through the web browser 114, the embedded web server 116 of FIG. 1 in this example accesses the registry 134 to identify and access an associated object. The selected object can display its respective user interface in an object user interface region 326, such as one of the user interfaces 218, 226, or 232 of FIG. 2. Alternatively, a user interface of a selected object can replace the entire user interface 300. When the selected object supports a real-time data feed, the data for the user interface may be streamed directly back to the web browser 114 as updates occur. However, where a real-time data feed is not supported, the content of the object user interface as displayed, for example in the object user interface region 326, may be updated upon each interaction between the web browser 114 and the selected object. In the example of FIG. 3, each of the links 308-314, 318-324 may be associated with a different object, such as a software object 132 or a hardware object 138 of FIG. 1. The object user interface region 326 can further display linked contents from the user interface of the selected object retrieved from another local or remote web server, such as the embedded hardware web server 118 or the maintenance or troubleshooting aid web server 120.

Figure 4:
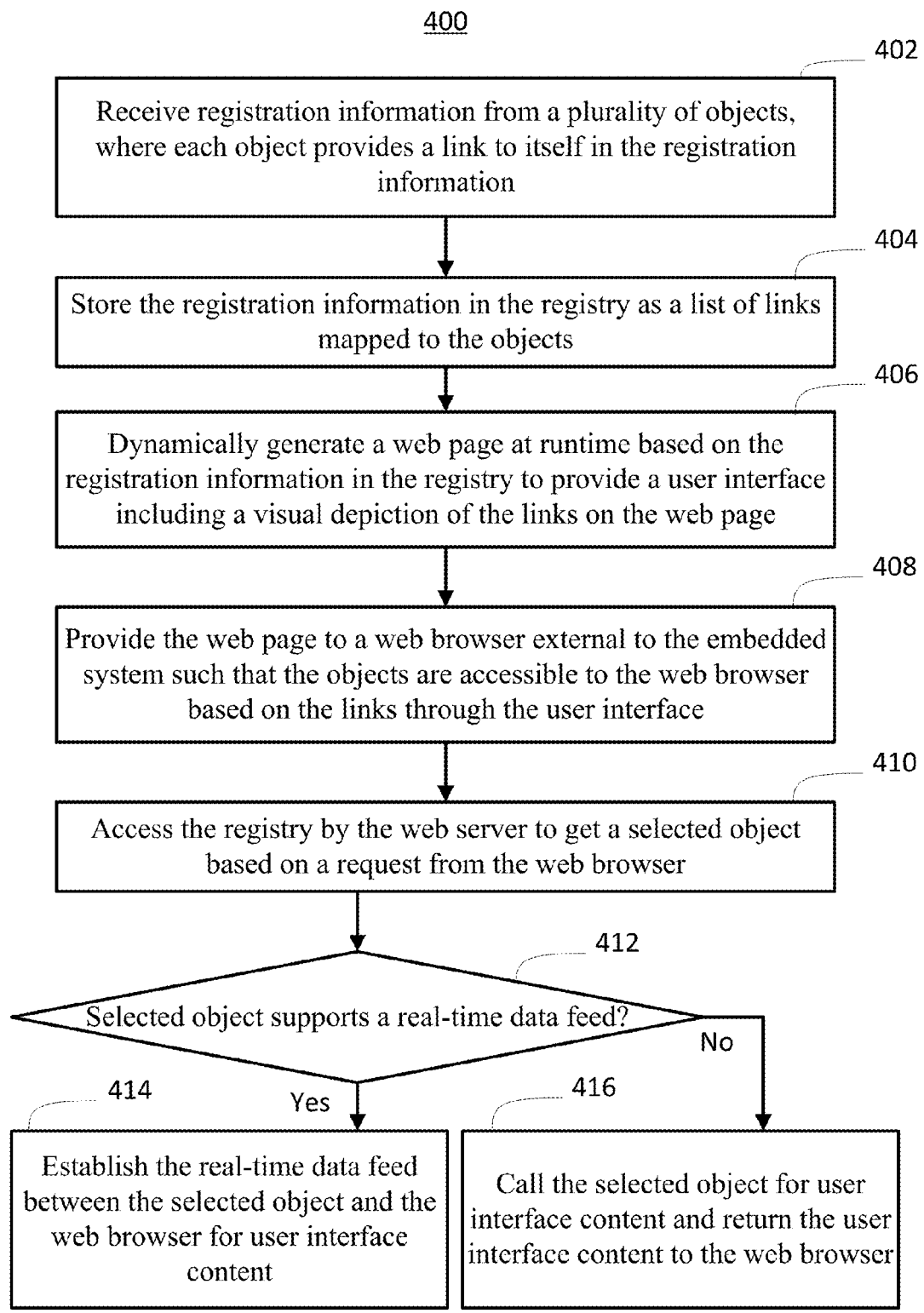
FIG. 4 illustrates an exemplary process for providing a web server in an embedded system.

FIG. 4 illustrates an exemplary process 400 for providing a web server in an embedded system, such as the embedded software web server 116 in the embedded system 102 of FIG. 1. The process 400 can be implemented in the system 100 of FIG. 1. Although the embedded software web server 116 is described as the web server in this example description, the embedded hardware web server 118 can be configured to perform a number of the web server actions described below. The process 400 is described in reference to FIGS. 1-4.

At block 402, the embedded software web server 116 receives registration information 204 from a plurality of objects 132, 138, where each object provides a link 208 to itself in the registration information 204. The registration information 204 provided by each object 132, 138 can include an object identifier 206, a desired display position 210 on the web page 136, an image 212 associated with the object 132, 138, and a real-time data feed support indication 214. As depicted in FIG. 2, each of the objects 132A, 132B, 138 provides its own user interface 218, 226, 232 respectively.

At block 404, the embedded software web server 116 can store the registration information 204 in the registry 134 as a list of links 208 mapped to the objects 132, 138. At block 406, the embedded software web server 116 dynamically generates the web page 136 at runtime based on the registration information 204 in the registry 134 to provide a user interface 300 including a visual depiction of links 308-314, 318-324 on the web page 136. At block 408, the embedded software web server 116 provides the web page 136 to a web browser 114 external to the embedded system 102 such that the objects 132, 138 are accessible to the web browser 114 based on the links 208 corresponding to the visual depiction of links 308-314, 318-324 through the user interface 300.

The web server can be the embedded software web server 116, and the objects can include a number of software objects 132. As previously described, at least one of the software objects 132 can link to another web server that is external to the embedded system 102 to provide additional associated information, such as maintenance or troubleshooting aid data 122 on the maintenance or troubleshooting aid web server 120. The embedded system 102 can also include hardware subsystem 112, including the embedded hardware web server 118 configured to link the hardware object 138 to the web page 136. The hardware object 138 is configured to provide the registration information 204 to the embedded software web server 116 through the embedded hardware web server 118 upon initialization. The hardware object 138 may be configured to provide its own user interface 232 to enable a user to perform one or more of: running a detailed hardware test, uploading acceptance data 140, downloading initialization data 142, delivering fault information, and updating runtime statistics via the web browser 114. At least one of the software objects 132 can also or alternatively enable a user to perform one or more of: running detailed software or system tests, uploading acceptance data 140, downloading initialization data 142, delivering fault information, and updating runtime statistics via the web browser 114.

The web browser 114 and the embedded software web server 116 and/or the embedded hardware web server 118 can support communication using a web socket protocol. A hypertext transfer protocol (HTTP) port connection can be established, for example, between the web browser 114 and the embedded software web server 116. A protocol switch is performed between the hypertext transfer protocol and a websocket protocol. Sending and receiving of data between the web browser 114 and the objects 132 and/or 138 can be performed using the websocket protocol. The websocket protocol may support real-time data feeds for objects that include real-time data feed support. Accordingly, at block 410 upon receiving an object request from the web browser 114, the embedded software web server 116 can access the registry 134 to get a selected object based on the request.

At block 412, the embedded software web server 116 can determine whether the selected object supports a real-time data feed by checking the real-time data feed support indication 214. Based on determining that the selected object supports the real-time data feed, a real-time data feed is established between the selected object and the web browser 114 for user interface content at block 414. Otherwise, at block 416, the selected object is called for user interface content, and the user interface content is returned to the web browser 114. As an example, software object 132A of FIG. 2 includes real-time data feed 222 which can automatically update data passed through the user interface 218 to the web browser 114 at regular time intervals. In contrast, since software object 132B does not include real-time data feed support, data may be passed through the user interface 226 as a static snapshot to the web browser 114.

The technical effects and benefits of the embodiments described herein provide dynamic web page generation in an embedded system web server by object self-registration. Each registered object can also provide its own user interface to minimize impact on related web pages as objects are added, removed, or modified.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for providing a web server in an embedded system, the method comprising:
receiving registration information at the web server in the embedded system from a plurality of objects, each object providing a link to itself in the registration information;
storing the registration information in a registry as a list of links mapped to the objects, wherein the registration information provided by each object further comprises a desired display position of the link to itself on a web page as identified by a row number defined in the desired display position and an indication as to whether each object supports a real-time data feed;
dynamically generating the web page at runtime by the web server based on the registration information in the registry to provide a user interface comprising a visual depiction of the links on the web page based on the desired display position of each of the links as defined by each of the objects, wherein the web server is an embedded software web server in a processing subsystem of the embedded system and the embedded system further comprises a hardware subsystem comprising an embedded hardware web server configured to link a hardware object in the hardware subsystem to the web page, and the hardware subsystem performs low-level signal control and timing to support operation of a controlled system coupled to the embedded system, wherein the controlled system is a radar system controlled by the hardware object, and the hardware object implements a plurality of user-initiated built-in tests of the radar system through the web page;
providing the web page to a web browser external to the embedded system such that the objects are accessible to the web browser based on the links through the user interface, wherein the objects comprise a plurality of software objects that map to the controlled system and one or more devices, wherein the one or more devices comprise a global positioning system locator accessible through the web page by one of the software objects;

accessing the registry by the web server to get a selected object based on a request from the web browser;

determining whether the selected object supports the real-time data feed based on the stored indication in the registry as to whether each object supports the real-time data feed;

based on determining that the selected object supports the real-time data feed, establishing the real-time data feed between the selected object and the web browser, and streaming data from the selected object to the web browser as updates occur;

based on determining that the selected object does not support the real-time data feed, calling the selected object for user interface content and returning the user interface content to the web browser upon each interaction between the web browser and the selected object; and based on detecting a change to a displayed parameter in the registry, dynamically regenerating the web page.

2. The method of claim 1, wherein each of the objects is configured to provide the registration information to the web server upon initialization.

3. The method of claim 2, wherein the registration information provided by each object further comprises an image associated with the object.

4. The method of claim 1, wherein each of the objects provides its own user interface.

5. The method of claim 4, wherein the web page includes an object user interface region that displays the user interface provided by the selected object and updates the user interface in the object user interface region according to whether the selected object supports the real-time data feed.

6. The method of claim 1, wherein at least one of the software objects links to another web server that is external to the embedded system.

7. The method of claim 1, wherein the hardware object is configured to provide the registration information to the embedded software web server through the embedded hardware web server upon initialization.

8. The method of claim 7, wherein the hardware object is configured to provide its own user interface to enable a user to perform one or more of: running a detailed hardware test, uploading acceptance data, downloading initialization data, delivering fault information, and updating runtime statistics via the web browser.

9. The method of claim 1, wherein at least one of the software objects is configured to provide its own user interface to enable a user to perform one or more of: running detailed software or system tests, uploading acceptance data, downloading initialization data, delivering fault information, and updating runtime statistics via the web browser.

10. The method of claim 1, further comprising:
establishing a hypertext transfer protocol port connection between the web browser and the web server;
performing a protocol switch between a hypertext transfer protocol and a websocket protocol; and
sending and receiving data between the web browser and the objects using the websocket protocol.

11. An embedded system, comprising:
a hardware subsystem configured to communicate via a network, wherein the hardware subsystem comprises an embedded hardware web server configured to link a hardware object in the hardware subsystem to a web page and perform low-level signal control and timing to support operation of a controlled system coupled to the embedded system, wherein the controlled system is a radar system controlled by the hardware object, and the hardware object implements a plurality of user-initiated built-in tests of the radar system through the web page; and a processing subsystem configured to communicate with a web browser via the network, wherein the processing subsystem comprises a registry and an embedded software web server, the embedded software web server configured to:

receive registration information from a plurality of objects, wherein each object provides a link to itself in the registration information;

store the registration information in the registry as a list of links mapped to the objects, wherein the registration information provided by each object further comprises a desired display position of the link to itself on the web page as identified by a row number defined in the desired display position and an indication as to whether each object supports a real-time data feed;

dynamically generate the web page at runtime based on the registration information in the registry to provide a user interface comprising a visual depiction of the links on the web page based on the desired display position of each of the links as defined by each of the objects;

provide the web page to the web browser external to the embedded system such that the objects are accessible to the web browser based on the links through the user interface, wherein the objects comprise a plurality of software objects that map to the controlled system and one or more devices, wherein the one or more devices comprise a global positioning system locator accessible through the web page by one of the software objects;

access the registry to get a selected object based on a request from the web browser;

determine whether the selected object supports the real-time data feed based on the stored indication in the registry as to whether each object supports the real-time data feed;

based on a determination that the selected object supports the real-time data feed, establish the real-time data feed between the selected object and the web browser, and stream data from the selected object to the web browser as updates occur;

based on a determination that the selected object does not support the real-time data feed, call the selected object for user interface content and return the user interface content to the web browser upon each interaction between the web browser and the selected object; and based on detecting a change to a displayed parameter in the registry, dynamically regenerating the web page.

12. The embedded system of claim 11, wherein each of the objects is configured to provide the registration information to the embedded software web server upon initialization, the registration information further comprising an image associated with the object.

13. The embedded system of claim 11, wherein each of the objects provides its own user interface.

14. The embedded system of claim 13, wherein the web page includes an object user interface region that displays the user interface provided by the selected object and updates the user interface in the object user interface region according to whether the selected object supports the real-time data feed.

15. The embedded system of claim 11, wherein at least one of the software objects links to another web server that is external to the embedded system.

16. The embedded system of claim 11, wherein the hardware object is configured to provide the registration information to the embedded software web server through the embedded hardware web server upon initialization.

17. The embedded system of claim 16, wherein the hardware object is configured to provide its own user interface to enable a user to perform one or more of: running a detailed hardware test, uploading acceptance data, downloading initialization data, delivering fault information, and updating runtime statistics via the web browser.

18. The embedded system of claim 11, wherein the embedded system is further configured to:
    establish a hypertext transfer protocol port connection between the web browser and the web server;
    perform a protocol switch between a hypertext transfer protocol and a websocket protocol; and
    send and receive data between the web browser and the objects using the websocket protocol.

* * * * *